United States Patent [19]

Moteki

[11] Patent Number: 4,789,909
[45] Date of Patent: Dec. 6, 1988

[54] METHOD AND APPARATUS FOR PLACING SERVO INFORMATION AT PREDETERMINED LOCATIONS ON A DISC

[75] Inventor: Eiji Moteki, Kawasaki, Japan
[73] Assignee: Fuji Electric Company Ltd., Kawasaki, Japan
[21] Appl. No.: 904,974
[22] Filed: Sep. 8, 1986
[30] Foreign Application Priority Data
  Sep. 12, 1985 [JP] Japan .................. 60-202066
[51] Int. Cl.$^4$ .............. G11B 5/56; H02P 8/00
[52] U.S. Cl. ............... 360/78.14; 360/77.06; 318/696
[58] Field of Search .......... 360/75, 77, 78; 318/696, 685

[56] References Cited

U.S. PATENT DOCUMENTS

| | | | |
|---|---|---|---|
| 3,562,725 | 2/1971 | Klein et al. | 360/77 |
| 3,787,727 | 1/1974 | McSparran | 318/696 |
| 3,977,024 | 8/1976 | Haneji et al. | 318/696 |
| 4,489,259 | 12/1984 | White et al. | 360/77 |
| 4,518,904 | 5/1985 | MacLeod et al. | 360/78 |
| 4,581,567 | 4/1986 | Yanagawa et al. | 360/75 |
| 4,602,197 | 7/1986 | Mattson | 318/696 |
| 4,609,953 | 9/1986 | Mizuno et al. | 360/78 |
| 4,622,603 | 11/1986 | Mizunuma et al. | 360/78 |
| 4,630,145 | 12/1986 | Thompson et al. | 360/77 |
| 4,636,884 | 1/1987 | Hattori et al. | 360/78 |
| 4,677,359 | 6/1987 | Enami et al. | 318/696 |

FOREIGN PATENT DOCUMENTS 50-99709 8/1975 Japan .

Primary Examiner—Raymond F. Cardillo, Jr.
Assistant Examiner—David L. Robertson
Attorney, Agent, or Firm—Spencer & Frank

[57] ABSTRACT

A method and apparatus for driving a two-phase motor having two phase coils and a head of a disc recording unit which records information data and servo information on a rotatively driven disc in a manner designed to assure proper placement of the servo tracks and increase the speed of reading and writing information data. The head is driven to first radial locations on the disc by exciting phase coils in an unbalanced condition with two phase currents which have differing non-zero magnitudes, and servo information is written at these locations as the disc rotates. The head is then driven to radial track locations which are predetermined relative to the first locations by first exciting the coils in a balanced condition with respect to two phase currents of substantially equal magnitude which drive the head to second predetermined radial locations, and then reading the servo information with the head at these latter locations and adjusting the location of the head to the predetermined relative locations based on the servo information which has been read.

8 Claims, 7 Drawing Sheets

METHOD AND APPARATUS FOR PLACING SERVO INFORMATION AT PREDETERMINED LOCATIONS ON A DISC

BACKGROUND OF THE INVENTION

1. Field Of The Invention

The present invention relates to a method for positioning a head in a disc recording unit, typically a so-called fixed disc unit.

More particularly, the present invention relates to a method for positioning a head by controlling a phase current of a motor so as to write a plurality of information data on respective circumferential tracks which are concentrically spaced apart from each other at various radial positions on a major surface of a disc or to read out a plurality of information data from the respective tracks.

2. Description Of The Prior Art

The reduction in diameter and the increase in storage capacity of a disc are demanded in a recently developed disc recording unit such as a fixed disc device. In order to meet these demands, efforts have been made to increase the storage density of a disc. It is necessary to provide several hundred recording tracks on each major surface of a small-diameter disc. As a result, a prior art open head control system which has been employed is not satisfactory in practice in order to properly position a transducer head for writing and reading data into and from the surface of the disc at the center line of each of a large number of tracks.

In the prior art control system of the type described above, only a so-called "seek" signal is applied to an actuator for driving the head so that the head is positioned at a designated track and the present position of the head is not detected. Accordingly, fine adjustment of the position of the head is not performed. For instance, in case of a 5.25-inch fixed disc unit, the open control system can be used when the maximum track density is less than 500 TPI (tracks per inch), but when the track density exceeds 700 TPI, a closed loop control system must be used in order to properly position the head in relation to the specific track.

Of course, the closed loop control system is based upon correct detection of the present position of the head. To this end, employed widely is a system in which the head itself reads out so-called servo information recorded on the surface of the disc so that the position of the head is detected by processing the readout signal.

In general, the so-called servo information recorded on the disc is in the form of digital signal like information data stored in a disc, and hence it is necessary to distinguish the readout servo information distinctly from the information data. To distinguish the information from each other, various methods are possible and in one of the methods, a read/write head is used to write the servo information in a region (that is, a track) which is spaced apart in the radial direction of the disc from a track in which the information data is stored.

The control system of the type described above will be further explained in detail with reference to FIGS. 1-4.

FIG. 1 illustrates major component parts of a prior art fixed disc recording unit. In FIG. 1, a plurality of discs 1 are securely attached to a spindle 1a and are spaced apart from each other by a predetermined distance in the vertical direction. The discs 1 are rotated at a high rotational velocity by a spindle motor 1b. One head 4 for writing and reading the data into and from the surface of the disc 1 is allotted to each surface of the discs 1. The respective heads 4 are mounted to head arms 4a which are supported by a carriage 5. An electric motor 6 reciprocates the carriage 5 and hence the heads 4 via a thin metal plate 5b in the directions indicated by an arrow P.

Each surface of the discs 1 is provided with a large number of concentric tracks 2 as best shown in FIG. 2 and so-called servo information 3 is recorded on a region spaced apart from each track 2 in the radial direction and in this case in a sector which interrupts each track 2.

Shown in FIG. 3 is the electric motor 6 for driving the head 4 for reading information data written in the track 2 and the servo information 3 from the surface of the disc 2. The motor 6 in FIG. 3 is a two-phase (in general, multi-phase) stepping motor. In response to the number of driving pulses applied to the motor 6, the head 4 is moved in the radial direction and stopped at a specific track 2 or the region 3 on which the servo information is recorded. In addition, the motor 6 functions as a torque motor in which depending on magnitudes of currents Ia and Ib flowing through coils 6a and 6b of the motor 6, phase position of a rotor 6c is controlled. In this case, the position of the rotor 6c is schematically indicated by a vector angle $\theta$ of a current vector sum I of the phase currents Ia and Ib. By the fine adjustment of the position of the rotor 6c, the head 4 is accurately brought to the center line of the track 2 or to a correct position at which the servo information 3 is stored.

FIG. 4 shows a detailed positional relationship between the detail of the servo information and the track 2. As is clear from FIGS. 2 and 4, the region 3 on which the servo information is recorded is radially spaced apart from the adjacent track 2 by a distance substantially equal to one half of the pitch between the tracks 2 and in order to detect the position of the head 4 in relation to the specific track 2 as shown in FIG. 4, two areas for servo information 3a and 3b are used. Each of the areas consists of a simple repetitive pattern of digital values as indicated by the vertical line segments. The two adjacent regions 3a and 3b on which the servo information is recorded are displaced from each other in the circumferential direction Q (that is, in the direction of rotation) so that they are not adjacent to each other in the circumferential direction.

When the head 4 is at the normal position PN with respect to the specific track 2, it is apparent that the magnitudes of the signals read out from the servo information 3a and 3b by the head 4 are equal to each other, and consequently the head 4 detects that the head 4 is properly positioned with respect to the specific track 2. However, when the head 4 is deviated from the normal position PN upwardly or downwardly even by a small distance as indicated by the chain lines, the magnitude of the signal read out from one of the two areas 3a and 3b for the servo information becomes higher than the magnitude of the signal read out from the other area for the servo information. Accordingly, the direction of the deviation of the head 4 can be determined depending upon which signal has a larger magnitude. The positional deviation $\Delta P$ can be detected from the difference between the magnitudes of the two signals. Therefore, in response to the positional data thus obtained, the head 4 can be so controlled as to be positioned at its normal position PN.

Meanwhile, in order to write the servo information 3a and 3b used for the detection of the position of the head 4, the head 4 must be brought to the positions Pa and Pb deviated from the normal position PN at which the head 4 is properly positioned with respect to the specific track 2. Furthermore, these deviated positions Pa and Pb must be spaced apart from the normal position PN by the same distance. It is of course possible to control the position of the head 4 so as to satisfy the above-described requirement when the servo information 3a and 3b is recorded. For instance, as shown in FIG. 3, in order to position the head 4 at the position Pa or Pb, the phase current Ia or Ib is solely supplied to the motor 6, while in order to position the head at its normal position PN, it is sufficient that the phase currents Ia and Ib having the same magnitude are simultaneously applied to the motor 6.

In practice, however, even when the head 4 is accurately controlled in the manner described above so as to write the servo information 3a and 3b, it occurs frequently that even when the head 4 is properly driven to be positioned at the specific track 2, it is not brought to its normal position PN, but to a position deviated from the normal position PN by ΔP.

Of course, in response to the signals obtained by reading the servo information 3a and 3b, such deviation ΔP can be corrected. But, in the case of a closed loop control system, information data is written into or read out from the specific track 2 only after the head 4 is accurately brought to the normal position PN, so that when the deviation ΔP occurs frequently, there arises the problem that the so-called access time, that is, a time interval from an instant at which a read/write instruction is issued to an instant at which a read/write operation starts, is long.

As described above, when two or more kinds of information such as information data and the servo information are written into or read out from the same surface of a disc, it takes an unexpectedly long time to bring the head to a the proper position for reading or writing by a closed loop control system. That is, there is a tendency that the access time becomes longer. So far, the reasons for such a longer access time have not yet been clarified in detail and there has been an increasing demand for shortening the access time so that the inherent performance of the closed loop control system may be fully utilized.

SUMMARY OF THE INVENTION

In view of the above, one of the objects of the present invention is to provide a method for positioning a head of a disc recording unit in which the head is controlled by closed loop control system with an access time shortened to a minimum.

In order to achieve the above objects, a method for positioning a head of a disc recording unit according to the present invention in which an electric motor having a rotor displaced in response to magnitudes of phase currents supplied to the electric motor is used to determine a radial position of the head mounted on the rotor in order to write into or read out from a plurality of information data along concentric circular tracks on the surface of a disc which are spaced apart from each other by a predetermined distance in the radial direction, comprises the steps of:

setting a balanced condition where magnitudes of phase currents to be supplied to the phase coils of the electric motor are substantially equal to each other when writing or reading at least one of the plurality of information;

determining a position of the head under the balanced condition;

setting an unbalanced condition where a magnitude of a phase current to be supplied to at least one phase coil of the electric motor is different from magnitudes of phase currents to be supplied to the remaining phase coils when writing or reading remaining information; and determining a position of the head under the unbalanced condition.

Here, in case of writing the remaining information, the magnitude of the phase current to be supplied to at least one phase coil of the electric motor can be smaller than the magnitudes of the phase currents delivered to the remaining phase coils, and at least any one of the magnitudes of the phase currents to be supplied to the remaining phase coils can not be zero.

The plurality of information data may consist of two information data, one of which is servo information data used to detect a present position of the head.

The servo information can be written only into a portion of the concentric circular tracks.

The servo information can be written by the head whose position is determined by supplying the phase currents to the electric motor under the unbalanced condition. The electric motor can be a two-phase electric motor.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figures 5A, 5B, 5C:
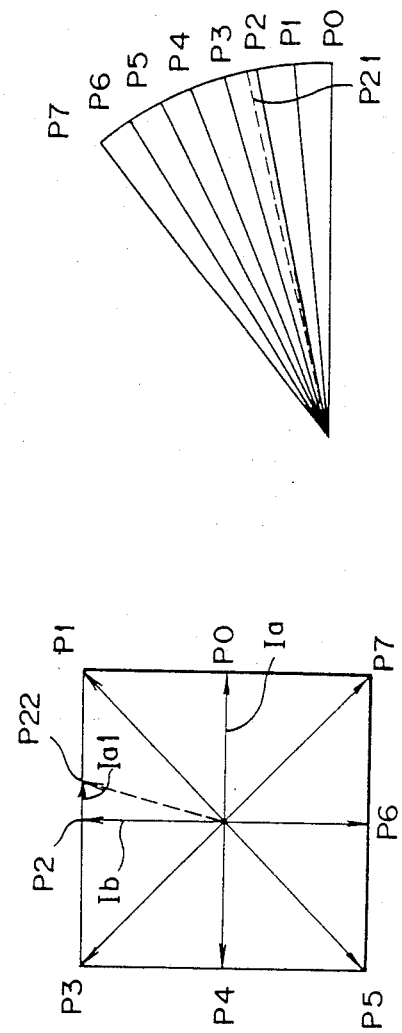
FIGS. 5A, 5B and 5C are vector diagrams illustrating the relationship between the electrical and mechanical angles of an electric motor in order to explain the underlying principle of the present invention.

Referring first to FIGS. 5A, 5B and 5C, the underlying principle of the present invention will be described.

Figure 1:
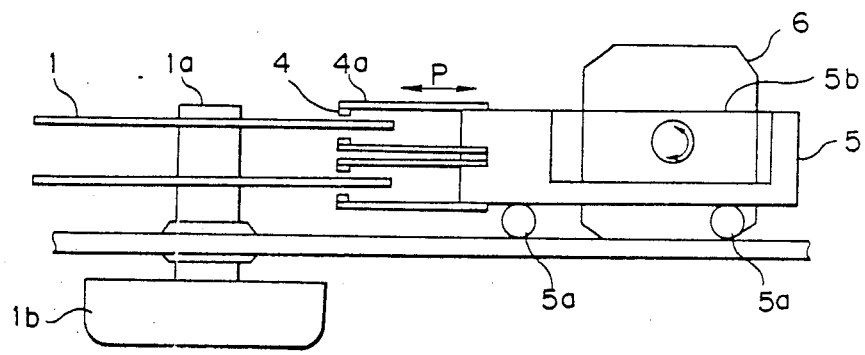
FIG. 1 is a side view showing a major part of a conventional disc recording unit.
Figure 2:
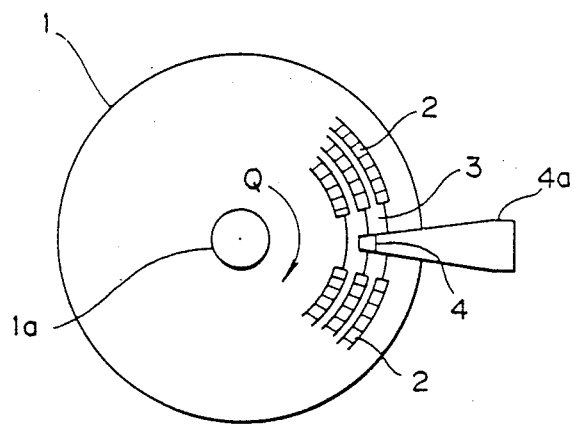
FIG. 2 is a top plan view showing one of a plurality of discs incorporated into the disc recording unit shown in FIG. 1.
Figure 3:
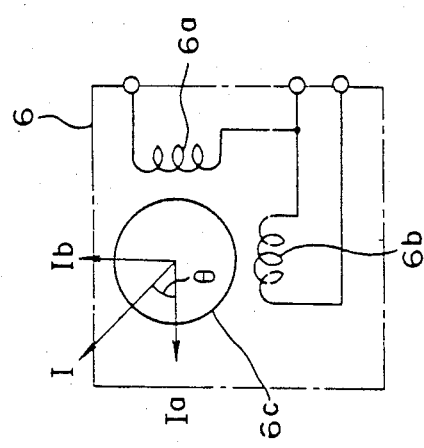
FIG. 3 is a circuit diagram showing an electric motor of the disc recording unit shown in FIG. 1.

As is apparent from the description above with reference to FIG. 3, the position (for instance, an angular position) of the rotor of a multi-phase motor for driving a head can be controlled in response to relative magnitudes of a plurality of phase currents.

FIG. 5A illustrates a relationship between a position P of the rotor of a two-phase electric motor and phase currents A and B applied to the rotor. In response to values +, 0 and − of the phase currents, the rotor of the two-phase motor can be positioned at one of the typical eight positions Pi (i=0 through 7).

These positions Pi are illustrated in terms of electrical angle in FIG. 5B, while they are illustrated in terms of mechanical angles in FIG. 5C. In this case, it should be noted that, as shown in FIG. 5B, the absolute magnitudes of positive and negative phase currents Ia and Ib are always the same. In FIG. 5C, the angular positions are illustrated on enlarged scale.

As easily seen from FIG. 5B, the electrical angle between the adjacent positions Pi of the rotor always remains the same, so that its mechanical angle is also theoretically the same. However, the results of experiments conducted with a high degree of precision show that even though the electrical angle between the adjacent positions remains the same, the corresponding mechanical angles between the adjacent positions are not always the same. Furthermore, it was found that the mechanical angle is apt to deviate at the positions P0, P2, P4 and P6 at which one of the two phase currents Ia and Ib is zero. For instance, as shown in FIG. 5C, the position P2 is apt to deflect toward the position P21, even though its deviation is very small.

Figure 4:
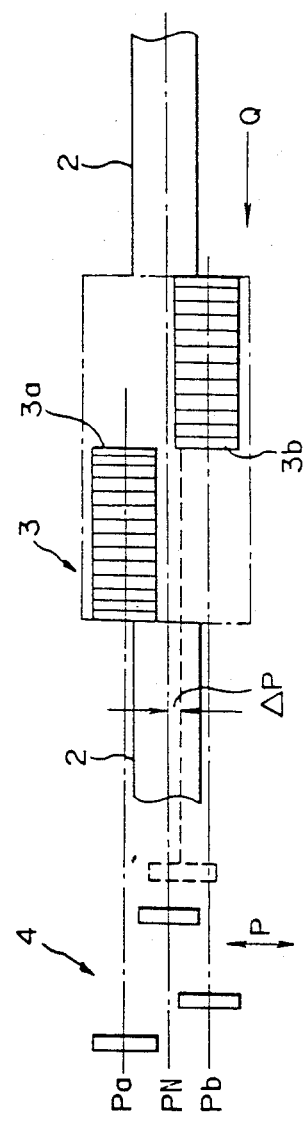
FIG. 4 is a schematic view showing a manner how the head of the disc recording unit as shown in FIG. 1 is positioned to a specific track or to a region on which the servo information is recorded.

Therefore, when the positions P1, P3, P5 and P7 at which the absolute values of the currents Ia and Ib are equal to each other are assigned to the position of the head 4 for the track 2 shown in FIG. 4, and when the positions P0, P2, P4 and P6 at which one of the two phase currents 1a and 1b is zero are assigned to the position at which the servo information 3 in written, the servo information 3 is written at the position P21 (See FIG. 5C) which is deviated from the normal position. As a result, even if the head 4 is brought to the correct position with respect to the track 2, the deviation ΔP occurs initially as shown in FIG. 4 and consequently it takes a time to correct this deviation.

Such deviation ΔP is considered to be caused not only by the incoincidence between the position in terms of the electric angle and the position in terms of the mechanical angle, but also by some play in a mechanical system for transmitting the rotation of the motor 6 to the head 4. According to the results of experiments, however, a deviation caused by some play in the mechanical system is less than a deviation caused by the incoincidence between the electrical and mechanical angles. It follows, therefore, that an initial deviation ΔP can be reduced to a minimum by eliminating such incoincidence. As a result, the access time can be shortened.

Therefore, in one embodiment of the present invention, the positions P1, P3, P5 and P7 corresponding to a condition that the magnitudes of the phase currents Ia and Ib are equal to each other (to be referred to as "a balance condition" in this specification hereinafter) are assigned to the position of the head 4 for the track 2. The positions P0, P2, P4 and P6 corresponding to a condition that one of the phase currents Ia and Ib is zero are assigned to the positions at which the servo information is written. In addition, for one of the two phase currents (for instance, the phase current Ia), a condition that a phase current Ia1 whose magnitude is, for example, determined empirically and which is lower in magnitude than the phase current Ib flows (to be referred to as "an unbalance condition" in this specification hereinafter), is established. That is, the tendency of the head 4 that the head 4 is likely to be deviated to a position corresponding to the position P21 of the rotor 6C in FIG. 5C is previously corrected by the unbalance condition, so that the head 4 is properly located at the normal position PN corresponding to the rotor position P2. That is, rather than using the current Ia=0 which would position the head at P2 if there were a coincidence between phase currents and rotor angle, a current Ia, of non-zero magnitude less than Ib must be used to locate the head at P2. Then, the servo information is written at a correct position, so that the head 4 is initially brought to the normal position PN or a position very slightly deviated therefrom, when the head 4 is positioned with respect to the track 2. As a result, in case that the head 4 is controlled by a closed loop control system, a required amount of correction is zero or a very small value, so that the access time can be significantly reduced as compared with the prior art method.

Contrary to the above-described embodiment, the positions which satisfy the balance condition may be used for the positioning of the head with respect to the servo information, while the positions which satisfy the unbalance condition may be used for the positioning of the head when writing or reading the data informaiton into or from the track 2.

When more than three kinds of information are recorded on the disc 1, one condition (for instance, the balance condition) is assigned to the positioning of the head with respect to the information which has a larger requirement of a shortened access time, while the other condition (for instance, the unbalance condition) may be assigned to the positioning of the head with respect to the information which does not have a large requirement of a shortened access time.

It is understood that the present invention may be equally applied to an electric motor with three or more phases. In this case, when the magnitude of one of a plurality of phase currents is different from the magnitudes of the remaining phase currents, the unbalance condition is established. In this case, it is apparent from the above description that it is also essential that either one of the magnitudes of the remaining phase currents must always have a value other than zero.

Figure 6:
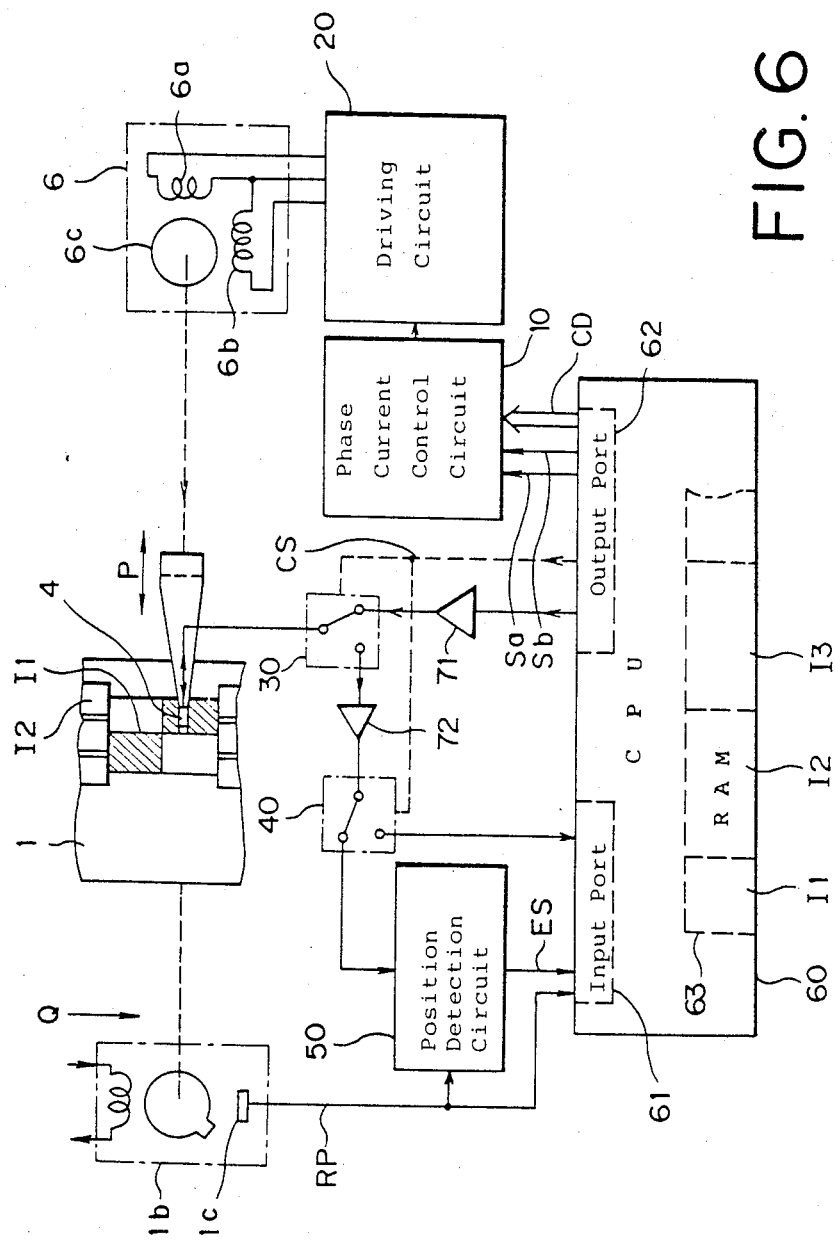
FIG. 6 is a block diagram showing a fundamental arrangement which embodies a method for positioning a head of a disc recording unit in accordance with the present invention.

FIG. 6 is a block diagram showing a fundamental construction of a disc recording unit which embodies the method of the present invention. The same reference numerals are used to designate similar or corresponding parts throughout FIGS. 1, 2, 3, 4 and 6. First information such as servo information I1 is recorded on the disc 1 rotated at a constant rotational speed by the spindle motor 1b and second information I2 such as data information to be recorded on the track 2 is recorded on the disc 1. The phase currents Ia and Ib are fed from a driving circuit 20 to the phase coils 6a and 6b of the electric motor 6 for properly positioning the head 4 for writing and reading information into and from the surface of the disc 1. A phase current control circuit 10 controls the magnitudes of the phase currents Ia and Ib supplied from the driving circuit 20 to the motor 6.

A central processing unit (CPU) 60 applies phase selection commands Sa and Sb and current value data CD to the phase current control circuit 10 through its output port 62. The CPU 60 has a RAM 63. The first information I1 and the second information I2 which are to be recorded on the disc 1 are stored in the RAM 63. The spindle motor 1b is provided with a Hall element 1c for detecting an angular position of the rotor of the motor 1b. The hall element 1c generates an index pulse (reference pulse) in response to which the information is written into or read out from the disc 1. The index pulse is applied to an input port 61 of the CPU 60 and a position detection circuit 50.

In addition, a read/write switching circuit 30 and a read-out signal switching circuit 40 are provided in order to control the switching of the flow of information. Furthermore, the disc recording unit has an amplifier 71 for amplifying an information signal to be written into the disc 1 and another amplifier 72 for amplifying a signal read out from the disc 1.

Figure 8:
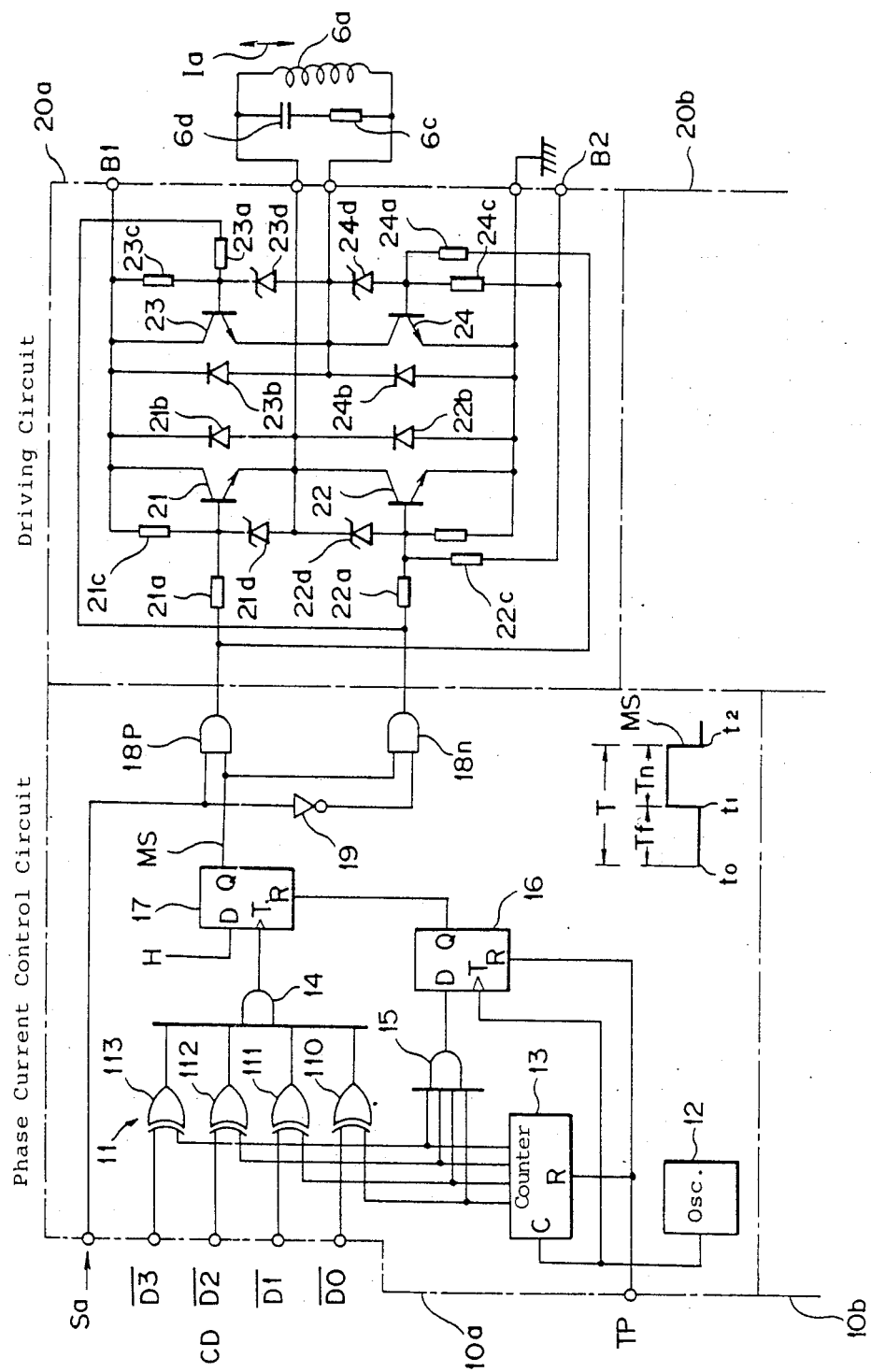
FIG. 8 is a circuit diagram showing a detailed embodiment of a phase current control circuit and a driving circuit shown in FIG. 6.

One embodiment of the phase current control circuit 10 and the driving circuit 20 is shown in detail in FIG. 8. A conventional analog switching circuit may be used as the read/write switching circuit 30 and the readout signal switching circuit 40. It is sufficient that the position detection circuit 50 detects the present position of the head 4 in response to the signal read out from the disc and may be a circuit disclosed in U.S. Pat. No. 3,893,180, issued on July 1st, 1975.

In order to write the first information I1 such as the servo information into the disc 1, the phase selection commands Sa and Sb and the current value data CD are supplied from the CPU 60 to the phase current control circuit 10 in order to bring the head 4 to a desired position on the disc 1. It is now assumed that the desired position is P2 shown in FIG. 5C. Then, the phase current Ia is zero, so that the head 4 is brought to the mechanically deviated position corresponding to the position P21 of the rotor 6C. Therefore, in order to correct this deviation to set the electric angle P22 shown in FIG. 5B, a current Ia1 must be made flow in phase A.

To this end, the CPU 60 first applies the phase selection command Sa and the current value data CD for designating a phase current of phase A to the phase current control circuit 10. In addition, in order to bring the head 4 to the position corresponding to electrical angle P22, it is necessary to flow the phase current Ib, so that the CPU 60 applies the phase selection command Sb and the current value data CD for designating the magnitude of the phase current Ib to the phase current control circuit 10. In response to these phase selection commands and the current value data, the head 4 is brought to a position at which the unbalance condition is satisfied, and the selection command CS (indicated by the broken line) is applied from the output port 62 of the CPU 60 to the read/write switching circuit 30 at a timing synchronized with the reference pulse RP. Then, the head 4 is connected to the amplifier 71 as shown in FIG. 6, and the first information I1 stored in the RAM 63 is transmitted through the output port 62 to the amplifier 71. In this manner, the first information I1 is written into a proper position designated by the CPU 60. This procedure must be performed for all positions P2, P4, P6, P8, etc.

In case of writing the second information I2 into the track 2 or reading out the second information I2 therefrom, the first information I1 stored in the disc 1 in areas 3a and 3b in the manner described above is first read out from the disc to detect the present position of the head 4, so that the head 4 is brought to the normal position PN. To this end, the CPU 60 transmits through its output port 62 the switching signal CS to the read/write switching circuit 30 and the read-out signal switching circuit 40, so that the head 4 is connected through the read/write switching circuit 30 to the amplifier 72 and the amplifier 72 is connected through the read-out signal switching circuit 40 to the position detection circuit 50. At the same time, the phase selection commands and the current value data for bringing the head to a desired position are transmitted to the phase current control circuit 10. For instance, in order to designate a Rotor position (for instance, P1) corresponding to the balance condition, the phase selection commands Sa and Sb and the current value data CD for flowing the phase currents Ia and Ib having the same magnitude in phases A and B are applied to the phase current control circuit 10.

As a result, the head 4 is brought to the normal position PN or a position very close to the position PN. If the position of the head 4 is deviated even slightly from the normal position PN, the signal which is read out by the head 4 and which represents the first information I1 is amplified by the amplifier 72 and applied to the position detection circuit 50. As a result, a positional error signal ES representative of a direction and an amount of the deviation of the head 4 in relation to the normal position PN is supplied from the position detection circuit 50 to the CPU 60.

Then, in response to the positional error signal ES, the CPU 60 slightly corrects the current value data which has been already determined and delivers the corrected current value data CD to the output port 62. In this case, both the current value data for determining the magnitudes of the phase currents Ia and Ib may be changed, but in general, it is sufficient to decrease only the current value data for determining the magnitude of one of the two phase currents Ia and Ib. In either case, the positional error signal ES generated after the abovedescribed correction is applied again to the CPU 60 until the CPU 60 confirms that the positional error signal ES becomes zero. Thereafter, in synchronism with the reference pulse RP which occurs subsequently (usually, after a predetermined short delay time), the CPU 60 issues the switching command CS again, so that in case of writing the second information I2, the movable contact of the read/write switching circuit 30 is switched to contact the other stationary contact, and in case of reading, the movable contact of the read-out signal switching circuit 40 is switched to contact the other stationary contact.

After the head 4 has been accurately brought to the normal position PN, the desired writing or reading is accomplished. In this case, since the head 4 is initially brought to its normal position PN or a position very close to the position PN, the access time can be considerably decreased as compared with the prior art methods.

Figure 7A:
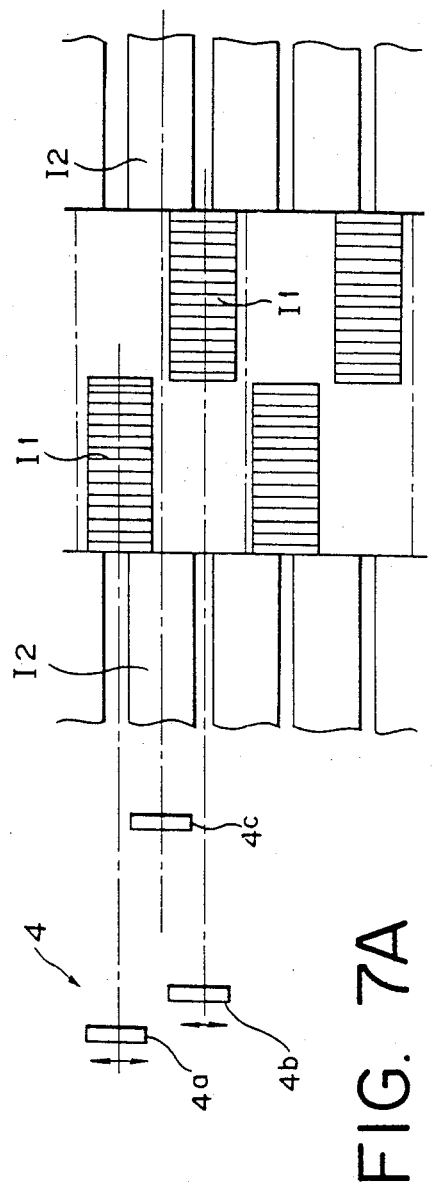
FIGS. 7A and 7B are explanatory diagrams used to explain modes of writing first and second information on the surface of a disc.

FIG. 7A shows an example of positions on the disc 1 at which the first and second information I1 and I2 are written in the manner described above. The current value data CD issued when the first information I1 is written corresponds to the vector diagram shown in FIG. 5B. That is, in the case of the writing of the first information I1, the head 4 is located at position 4a or 4b, while in case of the writing or reading of the second information I2, the head 4 is located at a position 4c.

Figure 7B:
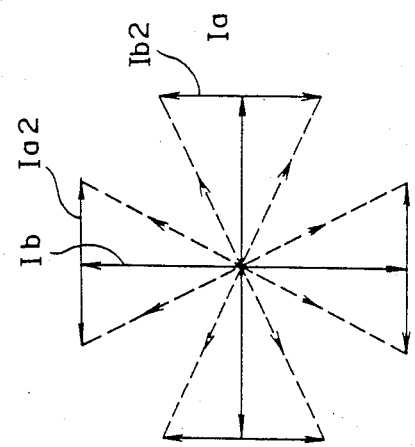
Figure 7C:
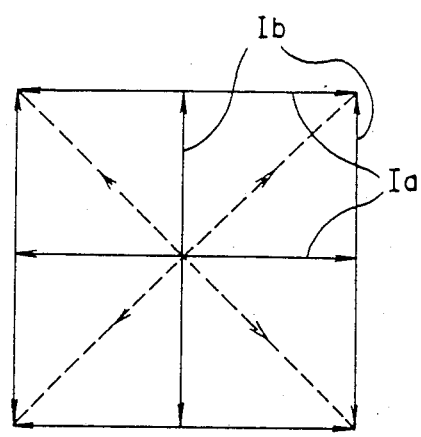
FIGS. 7C and 7D are vector diagrams illustrating modes of writing first and second information on the surface of a disc.
Figure 7D:
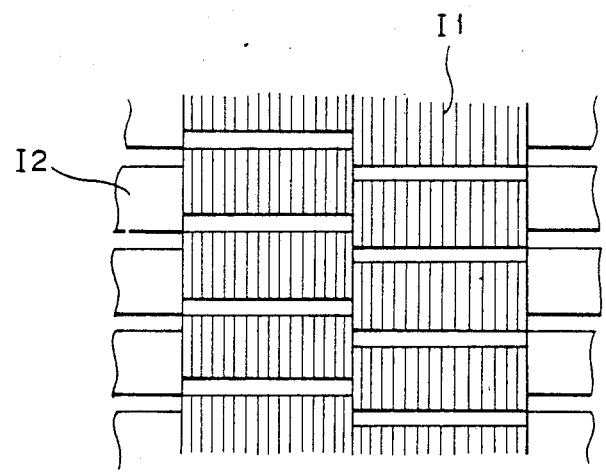

FIGS. 7B-7D show an example in which an arrangement of the storage positions of the first and second information I1 and I2 on the surface of the disc 1 are different from those described above. FIG. 7B shows the current value data CD issued in case of the writing of the first information I1, and FIG. 7C shows the current value data issued in case of the writing of the second information I2. In the case of the writing of the second information I2, the magnitude of the two phase currents Ia and Ib are equal to each other (the balance condition) like the previous case. On the other hand, in case of the writing of the first information I1, all of the phase current Ia or Ib is delivered to phase A or B, while the phase current Ia2 or Ib2 magnitude of which is determined, for example, empirically, and is smaller than the phase current Ia or Ib, is delivered to the other phase. FIG. 7D shows the positions and arrangement of the first and second information I1 and I2 on the surface of the disc 1 in response to the above-described current value data CD. It is readily seen that the area in which the first information I1 is written is doubled as compared with the recording pattern as shown in FIG. 7A. Consequently, the number of times of writing the first information I1 is doubled and accordingly a time required for the writing of the first information I1 is also doubled, but the smaller phase current Ia2 or Ib2 under the unbalance condition is greater than the phase current Ia1 shown in FIG. 5B, so that the position of the head 4 can be determined with a higher degree of accuracy.

FIG. 8 is a circuit diagram showing an embodiment of the phase current control circuit 10 and the driving circuit 20 shown in FIG. 6. Here, for the sake of simplicity, only the phase current control circuit 10a and the driving circuit 20a for phase A are shown. The phase coil 6a shown on the right side in FIG. 8 corresponds to phase A and the phase current Ia determined by a four-bit current value data CD consisting of bit data D0-D3 shown on the left side in FIG. 8 is applied to the phase coil 6a in the positive or negative direction. The direction of the phase current Ia is determined by the phase selection command Sa shown on the left topside in FIG. 8. The phase coil 6a is connected to a noise filter consisting of a resistor 6c and a capacitor 6d.

The driving circuit 20a has four transistors 21-24. The transistors 21 and 24 are paired, and the transistors 22 and 23 are paired in such a way that the two transistor pairs are alternately turned on. As a result, the positive or negative phase current Ia is supplied to the phase coil 6a. The component parts associated with these transistors 21-24 and the interconnection are well known in the art. These associated component parts include base resistors 21a-24a for determining the base currents, respectively, of the transistors 21-24, free wheeling diodes 21b-24b, high resistance resistors 21c-24c for raising the potentials of the prestage gates which determine the base potentials, and Zener diodes 21d-24d which function as switching noise killers for the prestage gates. Two types of voltages B1 and B2 are applied as power source voltages to the driving circuit 20a.

In the phase current control circuit 10a, a D flip-flop 17 produces as its Q output a PWM signal MS which is shown at the right lower corner of the block 10a indicated by the dash-and-dotted lines and which has a time period T. The signal MS is applied to AND gates 18p and 18n. The "ON" time interval Tn of the PWM signal MS corresponds to the four-bit current value data CD and, for instance, becomes zero when the current value data CD is 0 and becomes T when the current value data CD is 15. In this manner, the phase current Ia in proportion to a value designated by the current value data CD flows through the phase coil 6a. The AND gate 18p receives the phase selection command Sa, and the AND gate 18n receives the complementary signal of the phase selection command Sa inverted by an inverter 19. Therefore, when the phase selection command Sa is at a high level 'H', the AND condition is established in the AND gate 18p during a "ON" time interval Tn, so that the transistors 21 and 24 are turned on and consequently the positive phase current Ia flows through the phase coil 6a. On the other hand, when the phase selection command Sa is at a low level 'L', the AND condition is established in the AND gate 18n during an "ON" time interval Tn, so that the transistors 22 and 23 are turned on and consequently the negative phase current Ia flows through the phase coil 6a.

The remaining circuits in the phase current control circuit 10a respond to the complementary bit data D0-D3 of the current value data CD to determine the "OFF" time interval Tf of the PWM signal MS. The remaining circuits are triggered by the timing pulse TP synchronized with the reference pulse RP to generate the PWM signal MS. An exclusive OR gate group 11 includes four exclusive OR gates 110-113 having one input terminals receiving the complementary bit data D0-D3, respectively, and the other input terminals receiving the outputs, respectively, from the respective stages of a counter 13. A clock pulse is applied to the clock input terminal C of the counter 13 from an oscillator 12.

The timing pulse TP is applied to the reset input terminal R of the counter 13, so that the content thereof is cleared and then immediately starts counting the clock pulses. In this case, the Q output (that is, PWM signal MS) of the D flip-flop 17 is reset to a low level 'L' through another D flip-flop 16. The exclusive OR gate group 11 compares the content in the counter 13 with the complementary current value data and when the content in the counter 13 coincides with the complementary current value data CD, an AND gate 14 supplies a high level signal 'H' to the edge trigger input terminal T of the D flop-flop 17, so that the Q output thereof is raised to a high level 'H' at an instant $t_1$. In this case, it is assumed that a high level signal 'H' is always applied to the D input terminal of the D flop-flop 17.

An AND gate 15 detects the maximum count (for instance, 15) of the counter 13 to determine the period T. That is, at the last instant $t_2$ of the period T, the high level signal 'H' is applied to the D flop-flop 16, so that the Q output thereof is raised to a high level 'H'. As a result, the D flip-flop 17 is reset, so that the Q output thereof (that is, PWM signal MS) returns to a low level 'L'.

As described above, the inventor found that one of the causes of a long access time in the disc recording unit resides in the fact that it takes a long time to bring the head to a proper position and that the reason why it takes a long time before the head is brought to a proper position resides in the fact that the mechanical and electric angles of the head positioning motor do not necessarily coincide with each other, so that it takes a relatively long time before the head which is initially located at a deviated position is brought to its normal position by the closed loop control system.

In view of the above facts, according to the present invention, the position of the head for writing at least one information data of a plurality of information data is determined by setting the magnitudes of the currents to be supplied to the phase coils of the motor substantially equal to each other. The position of the head for writing the remaining information is determined by making the magnitude of the current to be supplied to at least one phase coil different from the magnitudes of the currents to be supplied to the remaining phase coils. As a result, the head is initially located substantially at its normal position, so that a time required for correcting the position of the head becomes negligible and consequently the access time is remarkably reduced as compared with the conventional disc recording unit.

More specifically, when the phase currents are supplied under the unbalance condition to the motor in order to write the servo information, it is not necessary to use the closed loop control system to determine the position of the head. On the other hand, when the phase currents are supplied under the balance condition to the motor in order to write and read into and from the surface of the disc, the head is initially brought to its normal position, so that no time is needed to perform the closed loop control to correct the position of the head.

As described above, according to the present invention, the closed loop control may be selectively applied to the positioning of the head in different manners depending upon whether the phase currents are under the balance condition or the unbalance condition. As a result, a capability of determining the position of the head with a high degree of accuracy which is inherent to the closed loop control system is fully utilized and the defect of a conventional disc recording unit that the access time is likely to be long can be substantially eliminated.

What is claimed is:

1. A method of driving with a two-phase motor having two phase coils, a head of a disc recording unit which records information data and servo information on a rotatively driven disc, comprising the steps of:
    driving the head to first predetermined radial locations on the disc by exciting the two phase coils in an unbalanced condition with respective first and second phase currents which have nonzero magnitudes which are different from each other and writing servo information at the predetermined locations on the disc as the disc rotates; and
    driving the head to radial track positions on the disc which are predetermined relative to the first predetermined radial locations by:
    exciting the two phase coils in a balanced condition with respective third and fourth phase currents which have substantially equal magnitudes to drive the head to second predetermined radial locations on the disc, and
    readiang the servo information with the head at the second predetermined radial locations and adjusting the location of the head to the predetermined relative positions based on the servo information which has been read, as the disc rotates.

2. A method as in claim 1, further comprising the step of one of writing and reading information data at the predetermined relative positions after said steps of reading and adjusting.

3. A method as in claim 2, wherein said step of exciting the two phase coils with respective first and second phase currents comprises the step of exciting the two phase coils with respective first and second phase currents wherein the magnitude of the first phase current is equal to the magnitude of the third and fourth phase currents and the magnitude of the second phase current is less than the magnitude of the first phase current.

4. A method as in claim 1, wherein said step of writing servo information comprises the step of writing servo information only into a segmental portion of each of a plurality of circular tracks on the disc.

5. A method as in claim 2, wherein said step of writing servo information comprises the step of writing servo information only into a segmental portion of each of a plurality of circular tracks on the disc.

6. A disc recording unit, comprising:
    a head for reading out or writing information data on tracks of a rotatably driven disc having a plurality of concentric circular tracks for recording information data on the disc;
    a two-phase stepping motor having means including two phase coils for displacing said head in a radial direction of the disc and relative to the disc;
    means for exciting said two phase coils in an unbalanced condition with respective first and second phase currents which have nonzero magnitudes which are different from each other to drive the head to first predetermined radial locations on the disc;
    circuit means for causing said head to write the servo information at the first predetermined locations on the disc as the disc rotates;
    means for exciting the two phase coils in a balanced condition with respective third and fourth phase currents which have substantially equal magnitudes to drive the head to second predetermined radial locations on the disc, said circuit means including means for causing said head to read the servo information at the second predetermined radial locations and means for adjusting through said motor the location of the head to positions which are predetermined relative to the first predetermined locations based on the servo information which has been read, as the disc rotates.

7. A disc recording unit, comprising:
    a head for reading out or writing information data on tracks of a rotatably driven disc having a plurality of concentric circular tracks for recording information data on the disc;
    a two-phase stepping motor having means including two phase coils for displacing said head in a radial direction of the disc and relative to the disc;
    means for providing first phase current data to excite said two phase coils in an unbalanced condition with respective first and second phase currents which have nonzero magnitudes which are different from each other to drive the head to first predetermined radial locations on the disc, and for providing second phase current data to excite said two phase coils in a balanced condition with respective third and fourth phase currents which are substantially equal to drive the head to second predetermined radial locations on the disc;
    writing means for driving said motor in accordance with one of said first phase current data and second phase current data, to write servo information data used for detecting a normal position of the tracks corresponding to the other of said first phase current data and said second phase current data, onto the disc by said head;

reading means for driving said motor in accordance with the other of said first phase current data and second phase current data, to read out the servo information data written by said writing means, said reading means including means for adjusting through said motor the location of the head to the normal position on the tracks based on the servo information which has been read, as the disc rotates.

8. A method of driving with a two-phase motor having two phase coils, a head of a disc recording unit which reads and records information data and servo information on a rotatively driven disc, comprising the steps of:

driving the head to a first predetermined radial location on the disc by exciting the two phase coils in a first unbalanced condition with respective first and second phase currents which have nonzero magnitudes which are different from each other and writing servo information at the first predetermined location on the disc as the disc rotates;

driving the head to a second predetermined radial location on the disc by exciting the two phase coils in a second unbalanced condition with respective third and fourth phase currents which have nonzero magnitudes which are different from each other, the magnitude of the fourth phase current being the same as the magnitude of the second phase current and writing servo information at the second predetermined location on the disc as the disc rotates; and driving the head to a radial track position on the disc which is between the first and second predetermined radial locations by:

exciting the two phase coils in a balanced condition with respective fifth and sixth phase currents which have substantially equal magnitudes to drive the head to a third predetermined radial location on the disc which is between first and second radial locations, and reading the servo information with the head at the third predetermined radial location and adjusting the location of the head to the track position based on the servo information which has been read, as the disc rotates.

* * * * *